United States Patent [19]
Chase

[11] Patent Number: 5,845,973
[45] Date of Patent: *Dec. 8, 1998

[54] METHOD FOR COMPENSATING FOR TOLERANCE VARIATIONS BETWEEN AN OVERLAY AND WHEEL ASSEMBLY

[75] Inventor: Lee A. Chase, Ada, Mich.

[73] Assignee: Lacks Industries, Inc., Grand Rapids, Mich.

[*] Notice: The term of this patent shall not extend beyond the expiration date of Pat. No. 5,597,213.

[21] Appl. No.: 704,289

[22] Filed: Aug. 28, 1996

Related U.S. Application Data

[63] Continuation of Ser. No. 467,700, Jun. 6, 1995, Pat. No. 5,597,213.

[51] Int. Cl.⁶ .................................................. B60B 7/06
[52] U.S. Cl. ........................................ 301/37.43; 301/37.1
[58] Field of Search ........................... 301/37.1, 37.42, 301/37.43, 64.2

[56] References Cited

U.S. PATENT DOCUMENTS

| | | |
|---|---|---|
| 3,669,501 | 6/1972 | Derleth .................................. 301/37.42 |
| 3,724,905 | 4/1973 | Kachler ............................. 301/37.37 X |
| 3,726,566 | 4/1973 | Beith ...................................... 301/37.1 |
| 5,031,966 | 7/1991 | Oakey ............................. 301/37.43 X |
| 5,143,426 | 9/1992 | Todd .................................. 301/37.43 |
| 5,368,370 | 11/1994 | Beam ............................. 301/37.43 X |
| 5,435,631 | 7/1995 | Maloney et al. ................. 301/37.42 X |
| 5,458,401 | 10/1995 | Baccman ............................. 301/37.43 |
| 5,595,423 | 1/1997 | Heck et al. .......................... 301/37.43 |

*Primary Examiner*—Russell D. Stormer
*Attorney, Agent, or Firm*—Vanophem Meehan & Vanophem, P.C.

[57] ABSTRACT

An apparatus and method for assembling to an automotive wheel an overlay composed of a solid plastic panel member that is directly attached to the surface of the wheel. In one aspect, an intermediate positive fixing element is provided for temporarily positioning and securing the overlay to the wheel during an interval in which a slow-curing, high strength adhesive that permanently adheres the overlay to the wheel is allowed to cure. An interrelated aspect involves the selective placement of adhesive between the overlay and the wheel so as to improve the overall manufacturability, performance, and consumer-perceived quality of the resulting wheel assembly.

8 Claims, 4 Drawing Sheets

METHOD FOR COMPENSATING FOR TOLERANCE VARIATIONS BETWEEN AN OVERLAY AND WHEEL ASSEMBLY

This is a continuation of application Ser. No. 08/467,700 filed Jun. 6, 1995 now U.S. Pat. No. 5,597,213.

BACKGROUND OF THE INVENTION

1. Field of the Invention

The present invention generally relates to automobile wheels that are equipped with a decorative overlay. More specifically, this invention relates to an apparatus and a method for securing an overlay to an automobile wheel in a manner that promotes the integrity of the overlay-to-wheel bond using selective amounts of adhesive, the positional accuracy of the overlay on the wheel, and the manufacturability and consumer-perceived quality of the combined wheel and overlay assembly.

2. Description of the Prior Art

Decorative overlays are widely used to enhance the aesthetic appearance of automotive wheels. Overlays are not only employed to improve the appearance of unadorned standard steel wheels, but are also used with cast aluminum wheels, which are known to be expensive and difficult to plate with chromium. Numerous structural approaches for combining overlays with other steel or cast wheels have been suggested by the prior art, as well as methods by which overlays can be secured to a wheel. Many overlays are mechanically attached, for example, German Patent 2,813, 412 mechanically attaches the overlay with cavities or undercuts in the face of the wheel. Further, German Patent 2,848,790 also teaches mechanical attachment of the wheel cover to the wheel through the use of clamps so that the cover can be removed for the purpose of cleaning. Others are adhered to the outboard surface of the wheel, as illustrated by U.S. Pat. No. 3,915,502 to Connell, which teaches an annular-shaped wheel cover that is permanently attached with double-sided adhesive tape to the wheel. The adhesive tape is positioned midway between the rim and the center hub area of the wheel, while the remainder of the wheel cover is spaced apart from the outboard surface of the wheel.

Connell presumably positions the adhesive tape at radially outward portions of the wheel in order to avoid the deleterious effects of heat generated by the tire, wheel and brake. While some pressure-sensitive adhesive tapes which can be effectively used in temperatures up to 500° F. (260° C.) are known and available, the cost of such adhesive tapes is generally prohibitive for use in mass production applications such as securing an overlay to a wheel. Consequently, such applications are generally limited to the use of less expensive adhesive tapes that have relatively low maximum operating temperatures, necessitating that their placement be restricted to the radially outward surfaces of the wheel. Unfortunately, doing so severely limits the adhesive tape's ability to reliably adhere the overlay to the wheel.

Another example of using an adhesive to bond an overlay to a wheel is taught by U.S. Pat. No. 3,669,501 to Derleth, which discloses an annular-shaped overlay composed of a thin plastic cover formed from acrylonitrile-butadiene-styrene (ABS) mounted to a wheel spider. The overlay is configured to have variations in contours in a direction transverse to the axis of the wheel which exceed the variations in the rim and/or disc contour of the wheel, which variations would be extremely difficult and expensive, if not impossible to stamp or draw in the disc of the wheel. During assembly, an adhesive foamable polyurethane is coated on the wheel, and the cover is then quickly clamped to the wheel before the polyurethane begins to foam. As such, the void between the wheel and cover is filled with the polyurethane foam, and any excess polyurethane foam formed around the bolt holes or at the periphery of the assembly, that is, between the cover and the wheel serves to permanently adhere the cover to the wheel.

Derleth teaches that the polyurethane foam adhesive provides a low-density, semi-resilient reinforcement for the thin gauge plastic cover while also providing sound insulation for tire and wind noise. However, it is understood by those skilled in the art that another reason for spacing the overlay's cover from the wheel surface is to avoid the deleterious effects of heat generated by the wheel and brake, which would otherwise distort the plastic cover and delaminate any surface treatment, i.e. paint, plating, etc., applied thereto. Further, the polyurethane foam adhesive completely breaks down at high temperatures experienced under certain actual road conditions. This is particularly true in the immediate region of the wheel hub where temperatures tend to be much higher than in the remainder of the wheel.

While the polyurethane foam adhesive taught by Derleth has an insulating effect, the thermal barrier provided by the foam adhesive is inferior to air. However, those skilled in the art will also appreciate that completely filling the cavity with the foam adhesive is advantageous in that doing so serves to acoustically damp any sound produced when the overlay is struck. Finally, the manner in which the foam adhesive is formed in situ on the wheel does not readily permit limiting the degree to which the foam adhesive fills the cavity.

An additional characteristic of the assembly method taught by Derleth is that the wheel must be available to the overlay manufacturer and handled during the assembly of the overlay to the wheel, rendering a manufacturing process which is somewhat complicated, awkward, and reliant upon the continuous availability of wheels, a condition which may be impractical for just-in-time manufacturing programs. Furthermore, timing of the processing steps used in the manufacture of Derleth's overlay is circumstantial in order to ensure that the cover is properly positioned, i.e. centered, over the wheel before the polyurethane begins to foam. Contrary to the method taught by Derleth, U.S. patent application Ser. No. 07/904,180 to Chase and U.S. Pat. No. 5,630,654 to Chase, both of which are assigned to the assignee of this invention, teach metal plated overlays that are formed independently and separately from the wheels to which they are to be attached. In particular, each of these overlays is formed of a metal-plated plastic panel that is permanently adhered directly to the surface of the wheel, preferably with a layer of a high temperature adhesive such as a silicone or polyurethane. Notably, the disclosed metal plating process enables the overlay to extend and cover high temperature regions of the wheel that prior art overlays are incapable of withstanding.

A further example of bonding an overlay to a wheel is taught by Beam in U.S. Pat. No. 5,368,370. Beam teaches an ornamental applique formed on a uniform thickness of stainless steel sheet stock which requires attachment to the wheel by the use of a full surface curable adhesive uniformly deposited between the stainless steel cover and a mechanical locking arrangement consisting of an undercut in the rim of the wheel into which the cover nests and a hole in the wheel aligned with a hole in the applique wherein a lug stud is permanently attached to create a mechanical lock which according to Beam's teachings compresses the full surface uniform layer of curable adhesive to hold the applique in place until the adhesive cures.

Beam's teachings present several problems. The mating of the stainless steel and the steel wheel at the rim area results in a galvanic action occurring which visibly is unacceptable in the marketplace. Further, at the hub portion of the wheel, the high temperatures experienced under certain driving or testing conditions may detrimentally affect the full surface uniform layer of curable adhesive while the cost of using a full surface curable adhesive is prohibitively expensive and wasteful since there is no need for a full surface uniform layer of adhesive to hold the overlay to the wheel. Further, a full surface uniform layer of curable adhesive also detrimentally affects the balancing considerations of the wheel and overlay assembly.

While such overlays have distinct advantages over previous overlays and assembly methods, further improvements are continuously sought. For example, a complication in the assembly procedure entailed with a separately formed overlay is that the position of the overlay with respect to the wheel rim must be accurately maintained while the adhesive cures, which can require several hours under optimal manufacturing conditions. Further desirable advancements include improving the overall manufacturability, performance, and consumer-perceived quality of the overlay and wheel assembly. However, such improvements are generally desirable only to the extent that any adverse effects on the weight, cost and balance of the resulting wheel assembly are avoided or minimized.

Accordingly, what is needed is an economical overlay apparatus and method for assembling such overlay to an automotive steel or alloy wheel, in which the method promotes the ability to accurately position and reliably permanently secure the overlay on the wheel by the use of selective application of an adhesive so as to improve the manufacturability of the wheel, reduce cost of manufacturing and not detrimentally affect wheel balance, performance and consumer-perceived quality of the wheel assembly.

SUMMARY OF THE INVENTION

According to the present invention there is provided a method for assembling decorative overlays on automotive aluminum and standard steel wheels. The method is an improvement over prior art overlays of the type that are formed separately from the wheel. In particular, overlays suitable for use in the method of this invention are preferably composed of a high impact, high heat resistant solid plastic panel member that is directly attached to a portion of the surface of a wheel. Generally, such overlays are adapted to be secured to a wheel's outboard surface, defined by a wheel disk or spider and a rim flange circumscribing the spider on each side of the wheel. As used herein, the outboard surface of the wheel is that surface of the wheel intended to be positioned on the laterally outward side of a vehicle and which, without the overlay, would be visible to an observer.

In one aspect, the present invention includes an intermediate positive fixing element for temporarily positioning and securing the overlay to a wheel during an interval in which a selectively positioned or applied adhesive required to permanently adhere the overlay to the wheel is allowed to cure. An interrelated aspect of this invention involves the selective placement of the adhesive between the overlay and the wheel to alleviate concerns of squeaks and rattles as well as to improve the overall manufacturability, performance, and consumer-perceived quality of the resulting wheel assembly.

The method of this invention generally involves forming the overlay to have an inboard surface configured to face the outboard surface of the wheel. In accordance with the first preferred aspect of this invention, the overlay includes elements which provide for it to be temporarily secured to the outboard surface of the wheel in such a manner that the overlay is positively yet removably positioned on the outboard surface of the wheel. Various elements for temporarily securing the overlay to the wheel are encompassed by this invention, including the use of high temperature resistant adhesives such as a hot melt adhesive or an adhesive tape, or the use of a mechanical element or elements such as biased fasteners or resilient projections formed on the inboard surface of the overlay or the outer surface of the wheel. In use, each of these elements cause the overlay to be spaced apart from the outboard surface of the wheel so as to define a gap therebetween as well as to concentrically locate the overlay with respect to the rim of the wheel in order to ensure an aesthetically acceptable appearance (high luster surfaces, i.e., chrome plating, greatly amplify concentric misalignment between the high luster surface along the edges of an overlay and the rim of a wheel). The gap between the wheel and overlay is required to accommodate a curable adhesive that serves to permanently secure the overlay to the wheel.

From the above, it can be seen that a distinction is made between temporary and permanent securement. For purposes of this invention, an element for temporarily securing and positioning the overlay denotes a material, element or device that, by itself, would not be expected to reliably secure the overlay to the outboard surface of the wheel throughout the intended service life of the wheel. For example, a hot melt adhesive or adhesive tape employed within the scope of this invention would not be able to withstand the maximum expected service temperature for the wheel. Similarly, any mechanical element or device for temporarily securing the overlay to the wheel would not be required to withstand the hostile physical environment for the service life of the wheel. In each instance, a permanent curable adhesive is employed for this permanent purpose, and the temporary element serves primarily to maintain the positional location of the overlay on the wheel during a period in which the permanent adhesive becomes fully cured.

Another important aspect of this invention is that the curable adhesive can be deposited selectively such that only a portion of the gap between the overlay and wheel is filled. As a result, one or more voids are present between the overlay and the outboard surface of the wheel. In accordance with this invention, the ability to reliably secure an overlay to a wheel without completely filling the gap therebetween was not anticipated or expected, given the hostile thermal and physical environment of an automotive wheel. Consequently, the prior art generally taught applying an adhesive over the entire mating full surfaces of an overlay and wheel. However, by eliminating the necessity to fill the entire gap between the overlay and wheel, the present invention enables the permanent adhesive to be selectively deposited to achieve any one or more refinements to the overall manufacturability, performance, and consumer-perceived quality of the wheel assembly. Accordingly, the application of the adhesive can be managed to control heat transfer from the wheel assisting in keeping brakes cooler. For example, the permanent adhesive can be applied only to the extent necessary to exclude moisture and dirt from the gap between the overlay and wheel. The resulting void can serve as a reservoir or chamber for air or moisture for air-cured and moisture-cured adhesives, thereby enhancing the cure rate of the adhesive. The permanent adhesive can also be deposited in order to manage thermal conduction between the wheel and overlay, prevent mud and water entrapments, tailor the acoustical characteristics of the wheel assembly, and avoid detrimental conditions which affect the balance of the wheel. Finally, the use of significantly less adhesive also serves to reduce the weight and associated balance problems as well as overall manufacturing cost of the wheel assembly.

Accordingly, it is an object of the present invention to provide an overlay for an automotive wheel, in which the overlay is formed separately from the wheel and therefore must be assembled to the wheel.

It is another object of the invention to provide a method of assembling such an overlay with a wheel, in which the overlay is temporarily secured to the wheel for a duration sufficient to allow a permanent adhesive to adhere the overlay to the wheel.

It is yet a further object of the invention to selectively manage the application amounts of the adhesive as well as the location of the adhesive between the overlay and the wheel in order to optimize the curing time while maintaining all other design criteria.

It is still another object of the invention that the overlay be temporarily secured in a manner that maintains the position of the overlay with respect to the rim on the wheel while the permanent curable adhesive cures.

It is a further object of the invention that the method enable a selective amount of permanent adhesive to be used, such that various manufacturing, performance, and quality-related characteristics of the wheel assembly can be tailored by the selective placement of the permanent adhesive between the overlay and wheel.

It is yet a further object of the invention that the method enable the deposition and cure rates of the permanent adhesive to be improved by providing air channels to insulate the cladding from extreme temperatures or to enhance air movement to allow rapid escape of the heat and avoid debilitating effects on the overlay and to create air pockets to enhance moisture characteristics to assist in curing the permanent adhesive.

It is still a further object of the invention that the method enable the cost and weight of the resulting wheel assembly to be reduced yet provide flexibility regarding aesthetics while maintaining a proper wheel balance and other engineering characteristics.

Other objects and advantages of this invention will be more apparent after a reading of the following detailed description taken in conjunction with the drawings provided.

DETAILED DESCRIPTION OF THE PREFERRED EMBODIMENT

Figure 1:
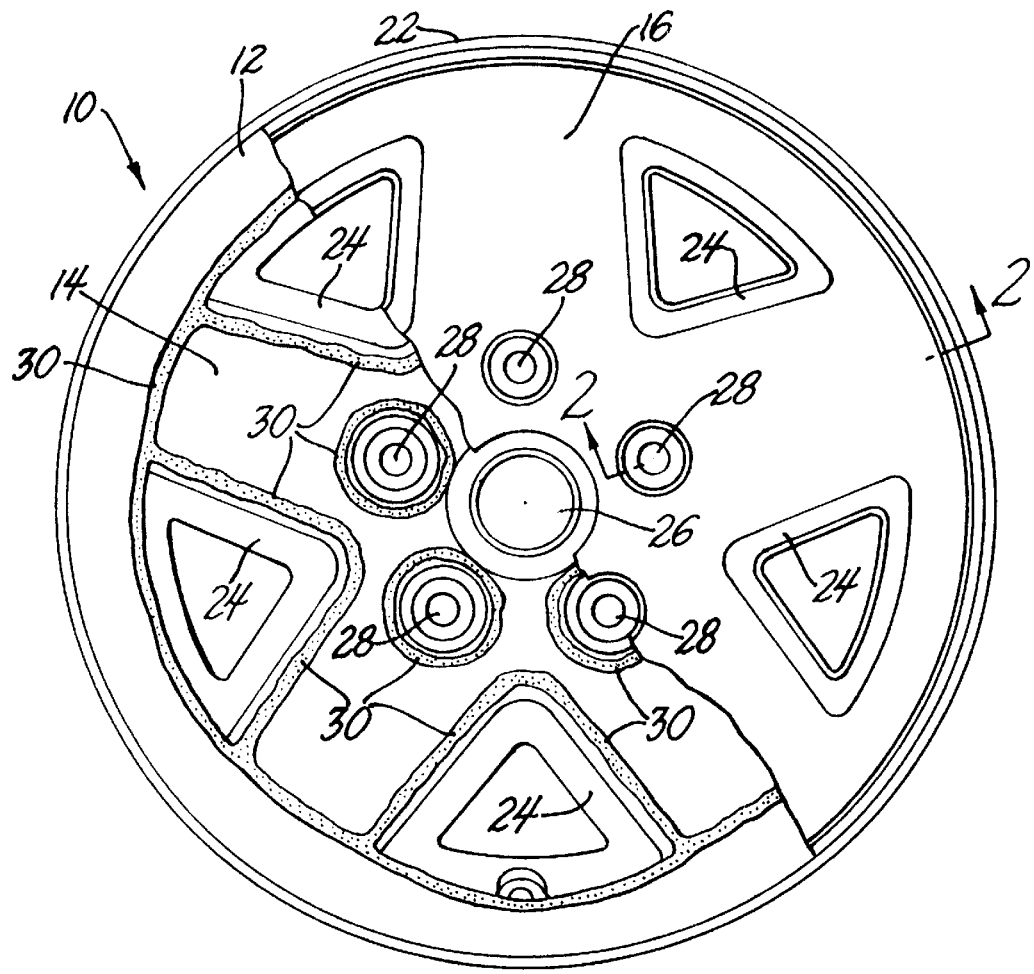
FIG. 1 shows an automotive wheel on which an overlay is adhered in accordance with an embodiment of this invention, a portion of the overlay being broken away so as to illustrate certain features and aspects of this invention.

With reference to FIG. 1, an assembly of the outboard surface of a wheel 10 for an automobile is shown. The wheel 10 includes an annular rim or rim flange 12 and a wheel disk, spider or web 14 that together define an outboard surface of the wheel 10, and an overlay 16 that is a solid panel of a uniform thickness, preferably of a high-impact plastic and high temperature resistance, secured directly to the outboard surface of the wheel 10. The wheel 10 includes a pair of the rim flanges 12 (only one of which is shown) spaced on opposing sides of a well portion 15, (FIG. 2) over which the standard tire is mounted. The rim flanges circumscribe the disk or web 14, and may be welded to the perimeter of the disk or web 14, as in the case of a standard steel wheel, or integrally cast with the disk 14, as in the case of a cast aluminum wheel. Located in the center of the disk 14 is a hub opening 26 which generally serves to permit mounting of the wheel on a wheel balancing or tire mounting machine to mount and/or balance a tire. In some applications the hub opening provides access for lubrication of the wheel bearings. Additional features on the outboard surface of the wheel 10 include lug bolt openings 28 for receiving lug bolts that fasten the wheel 10 to the wheel hub, and turbine openings 24 that serve to stylize the wheel 10 or in some applications provide the function of cooling the brakes (not shown).

Figure 2:
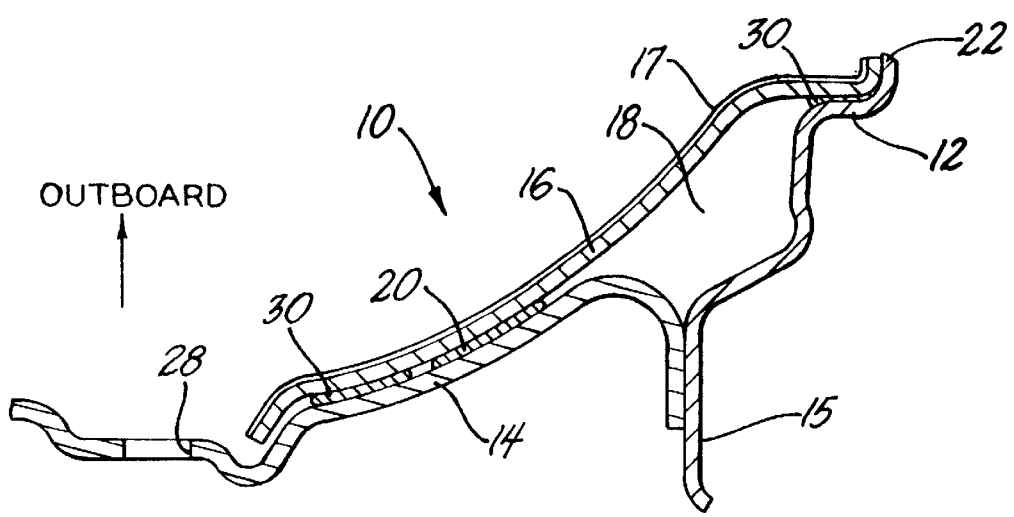
FIGS. 2 through 7 are cross-sectional views taken along arrow 2—2 of FIG. 1, illustrating the outboard side of an automotive wheel with an overlay attached, in which various elements are employed as temporary securing and positioning elements between the overlay and wheel.

As shown in FIG. 2, the inboard surface of the overlay 16 is configured to face the outboard surface of the wheel 10 when assembled. The opposite, or outboard surface of the overlay 16 is therefore visible when the overlay 16 is assembled to the wheel 10. The outboard surface of the overlay 16 is adapted to receive a decorative treatment layer 17. Preferably, a bright metal layer is electrochemically plated onto the outboard surface of the overlay 16 so as to contribute a bright appearance which adds an aesthetically pleasing appearance to the wheel 10. A painted surface is also contemplated for some applications. Furthermore, the overlay 16 is preferably formed from a high impact plastic having an appropriate treatment layer 17 on the outboard side thereof such that the overlay 16 and its metal plating are highly resistant to the adverse thermal environment of the wheel 10. Alternatively, other high impact and high temperature resistant plastic overlays are contemplated. As a result, the metal-plated outboard surface of the overlay 16 can be allowed to adhere to the contours of the outboard surface of the wheel 10, while resisting delamination of the metal plating due to heat or other environmental elements. As shown in FIG. 1, the overlay 16 primarily covers that portion of the outboard surface of the wheel 10 formed by the disk 14 inclusive of the rim flange 12. However, in some applications the overlay does not extend to the outer lip 22 of the rim 12.

As also shown in FIG. 1, the wheel 10 further includes a high strength, permanent adhesive 30 that is selectively deposited between the overlay 16 and the outboard surface of the wheel 10 for the purpose of permanently securing the overlay 16 to the wheel 10. The adhesive 30 is selectively deposited preferably near the perimeter of the outboard surface of the wheel 10 and around the lug bolt openings 28 so as to, in this application, prevent the ingress of water and dirt between the overlay 16 and the wheel 10. As stated above, the selective application of the adhesive can be dependent on the feature of the invention which is intended to be enhanced, as will be explained hereinafter. Notably, significant portions of the interior of the outboard surface are not covered by the adhesive 30, such that large voids are present between the overlay 16 and the wheel 10 as a result of the overlay 16 being axially spaced apart from the outboard surface by the adhesive 30 for a purpose hereinafter to be disclosed.

The limited amount of adhesive 30 employed by this invention was not an expected possibility, particularly since the adhesive 30 serves as the permanent and primary element for securing the overlay 16 to the wheel 10. Furthermore, the use of such a limited amount of adhesive 30 is contrary to that taught in the prior art. Yet, high strength adhesives that are suitable for use as the adhesive 30 of this invention are known and commercially available. Because of their high temperature capability and desirable mechanical properties, silicone and polyurethane adhesives are preferred. However, it is foreseeable that other high strength as well as high temperature resistive adhesives could be employed with satisfactory results. While suitable adhesives for use as the adhesive 30 must have excellent mechanical properties, such adhesives are generally characterized by relatively slow cure rates that can require several hours before the adhesive 30 is sufficiently set to absorb severe impacts or harsh handling without detrimental effects thereto.

Accordingly, through experimentation with various adhesives it has been found that by managing the amounts of adhesive and its location it is contemplated to optimize the cure time. An example of such optimizing would be to create parallel but separated lines of adhesive rather than a solid layer. The air between the lines of adhesives is captured between the overlay and the wheel to assist in curing the adhesive. Further curing for certain adhesives is significantly reduced by exposure to moisture laden air. In such cases high humidity air is introduced into the assembly process and the technique of selective application of the adhesive can be utilized to establish air pockets which serve to entrap moisture laden air further enhancing cure times.

The wheel and overlay configuration illustrated in FIG. 1 is useful for illustrating two of the three advantageous aspects of the present invention. A first aspect involves the use of one or more intermediate positive fixing elements for temporarily positioning and securing the overlay 16 to the wheel 10 during an interval in which the adhesive 30 is allowed to cure. A second and interrelated aspect of this invention involves the selective placement of the adhesive 30 between the overlay 16 and the wheel 10 so as to improve the overall manufacturability, performance, and consumer-perceived quality of the resulting wheel assembly. The first aspect of this invention is represented in greater detail by the embodiments shown in FIGS. 2 through 6, while the second aspect will be explained with reference to FIG. 1. A third advantageous aspect of the invention as illustrated in FIG. 7 is the use of the adhesive to compensate for tolerance variations between the wheel and the overlay in order to provide a wheel assembly which is acceptable for its intended use.

FIG. 2 illustrates a first method for assembling a wheel 10 and overlay 16 in accordance with this invention. FIG. 2 represents in partial cross section a standard steel wheel whose components are identified by the same reference numbers as the corresponding components shown in FIG. 1 for the cast aluminum wheel. The cross section shown in FIG. 2 is generally analogous to that indicated by section line 2—2 of FIG. 1.

The method of FIG. 2 generally entails the use of a hot melt adhesive 20 combined with the use of the high strength, slow-curing adhesive 30 that are each selectively deposited on either the inboard surface of the overlay 16 or the outboard surface of the wheel 10. As shown, the hot melt adhesive 20 is located in a radially intermediate region of a gap 18 between the overlay 16 and the wheel 10. As a hot melt adhesive with a limited service temperature, the adhesive 20 is capable of creating a bond almost instantly, but is ill suited for securing the overlay 16 to the outboard surface of the wheel 10 over its service life, that is, once the wheel 10 is installed and in use on an automobile. Therefore, the adhesive 20 is characterized as being suitable only for temporarily securing the overlay 16 to the outboard surface of the wheel 10 during the assembly of the overlay 16 and wheel 10 and while the high strength, slow-curing adhesive 30 is curing. Advantageously, such use comes during a critical period when the overlay 16 is susceptible to movement relative to the wheel 10. Accordingly, while the hot melt adhesive 20 is not suitable for permanently securing the overlay 16 to the wheel 10, the hot melt adhesive 20 is readily capable of positively maintaining the position of the overlay 16 on the outboard surface of the wheel 10 during the period in which the adhesive 30 is curing.

The above contrast made between temporary and permanent securement is an important distinction as used in the detailed description and claims of this invention. In effect, an element for temporarily securing and positioning the overlay 16 on the wheel 10 is a material, element or device that, by itself, would not be expected to reliably secure the overlay 16 to the outboard surface of the wheel 10 during the normal useful life of the wheel 10. This distinction is further illustrated with reference to the curable adhesive 30, which is specifically selected and employed to permanently secure the overlay 16 to the wheel 10. Illustrated in FIGS. 3 through 7 are various additional elements that are suitable for temporarily securing an overlay to a wheel within the meaning of the term "temporary" as used herein.

Figure 3:
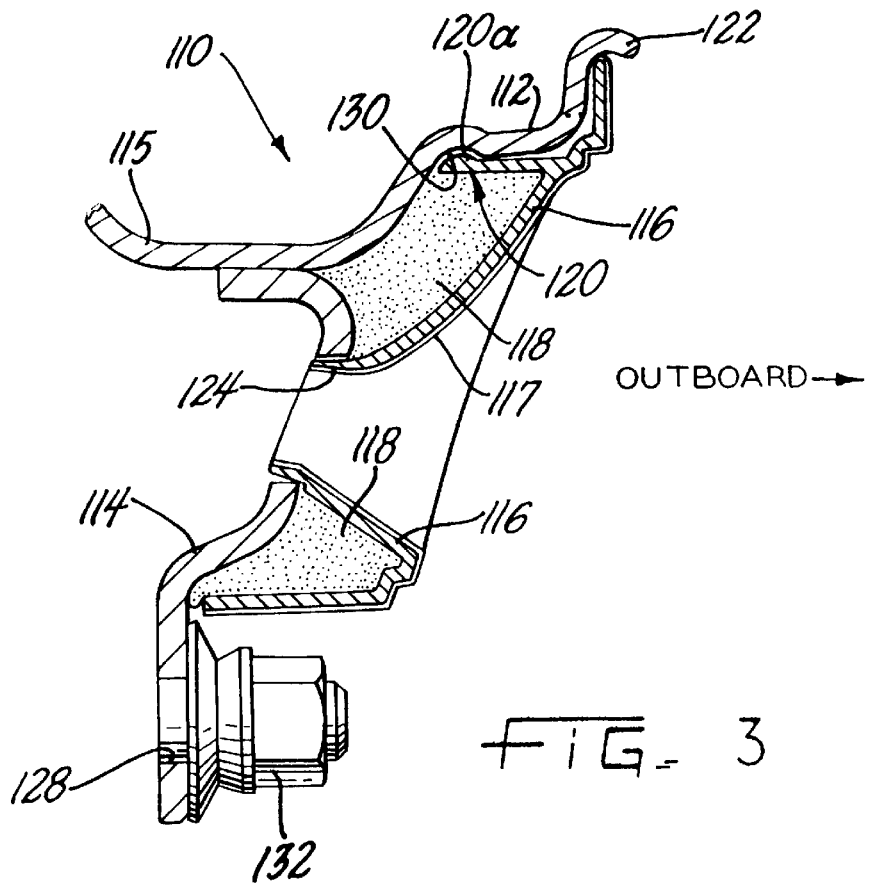

Shown in FIG. 3 is an embodiment in which the element for temporarily positioning and securing an overlay 116 to a steel wheel 110 is composed of concentrically disposed snap tabs 120 extending from the inboard surface of the overlay 116 in a direction towards the wheel. Though the wheel 110 shown in FIG. 3 is of a different construction than that shown in FIG. 2, such a distinction is not a limitation to the scope of the invention, but instead serves to illustrate the adaptability of this invention to various wheel designs and configurations. As shown, the overlay 116 and the wheel's disk 114 define turbine openings 124 similar to that shown in FIG. 1.

The snap tab 120 is shown as being integrally molded with the overlay 116, and having an elongate shape with a prominence 120a formed on a radially outward face near the distal end of the snap tab 120. As such, the snap tab 120 provides for a biased resilient interference fit with the rim 112, and particularly a depression 130 created by the rim's wheel bead seat. As those skilled in the art are aware, the bead seat must be precisely formed so as to properly receive and seal with the bead of a tire mounted on the wheel 110. Accordingly, the depression 130 formed by the bead seat of the steel wheel 110 is highly suited for use as a datum for accurately centering the overlay 116 on the wheel 110 and to maintain such centering while a suitable adhesive is allowed to cure and permanently attach the overlay to the wheel.

The snap tab 120 also serves to space the inboard surface of the overlay 116 axially apart from the outboard surface of the wheel 110, such that a gap 118 is formed in which a curable adhesive is selectively deposited. As illustrated, the curable adhesive is of the foaming type. In the embodiment of FIG. 3, the curable adhesive completely fills the gap 118, contrary to that shown in FIGS. 1 and 2. As with the embodiment of FIG. 2, the snap tabs 120 are not physically constructed to withstand the hostile environment of the service life of the wheel 110. More particularly, the snap tabs 120 are not physically configured to withstand the forces and impacts necessary to permanently mount the overlay 116 on the wheel 110. Instead, and as before, the curable adhesive within the gap 118 serves as the permanent securement for the overlay 116 on the wheel 110.

Figure 4:
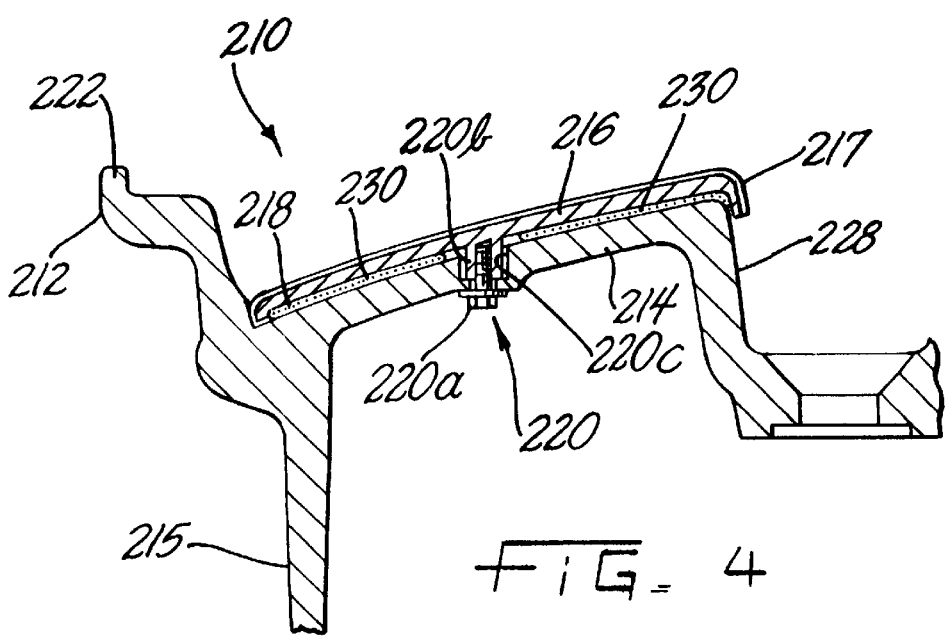

Another mechanical element 220 for temporarily positioning and securing an overlay 216 to a wheel 210 is shown in FIG. 4. The wheel 210 is depicted as being a cast aluminum wheel, in which the rim 212 and disk 214 are integrally cast. The mechanical element 220 is shown as a threaded fastener 220a that is received in an opening 220c cast or machined in the disk 214, and threaded into a boss 220b integrally molded in the overlay 216. Though a fastener 220a is used, its function is the same as that of the snap tabs 120 of FIG. 3. Therefore, the fastener 220a and its mounting structure are not required to withstand the forces and impacts in order to permanently mount the overlay 216 to the wheel 210, in that a curable adhesive 230 disposed within a gap 218 between the overlay 216 and the wheel 210 serves this purpose. As such, the fastener 220a and boss 220b need only be sufficiently strong to temporarily retain the overlay 216 on the wheel 210 until such time as the curable adhesive 230 is fully cured.

Figure 5:
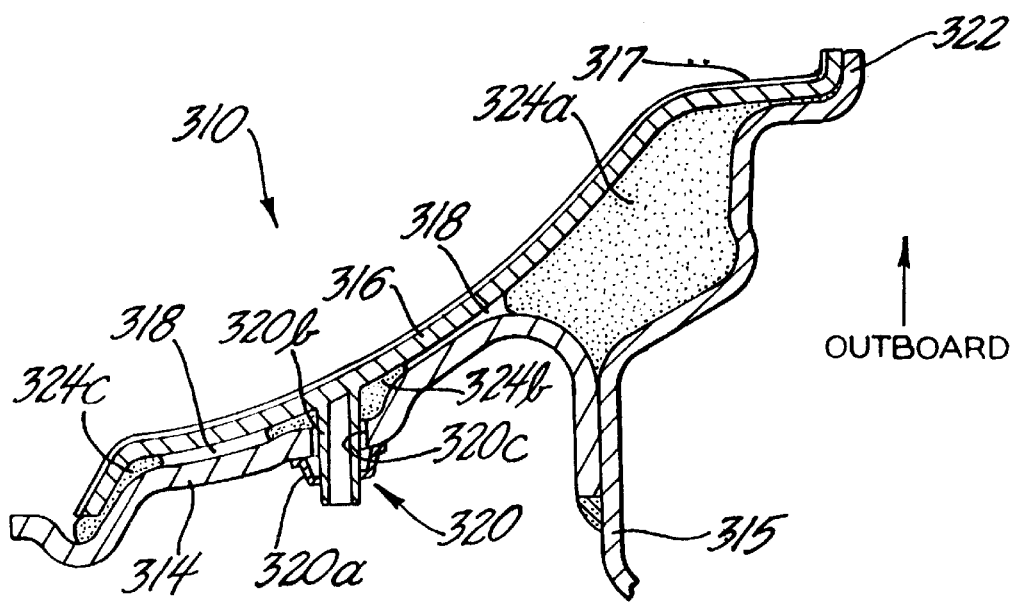

Yet another embodiment of a mechanical element 320 for temporarily positioning and securing an overlay 316 to a wheel 310 is shown in FIG. 5. The wheel 310 shown in FIG. 5 is again a steel wheel with a rim 312 welded to a disk 314. In this embodiment, the mechanical element 320 is a push-on type of stud receiver, such as a palnut 320a, assembled on a post 320b extending through an opening 320c in the disk 314. The post or projection 320b is integrally formed with the overlay 316. The palnut 320a again illustrates the temporary function of securement elements within the scope of this invention, in that the palnut 320a and its post 320b are not designed to permanently secure the overlay 316 to the wheel 310 within the hostile environment encountered by the wheel 310. A foam adhesive, such as the type noted in reference to FIG. 3, is shown as being disposed within a gap 318 between the overlay 316 and the wheel 310 for this purpose. Contrary to the embodiment of FIG. 3, the adhesive does not completely fill the gap 318, but instead is selectively deposited to form a first adhesive mass 324a adjacent the edge 322 of the rim 312, a second adhesive mass 324b around the post 320b, and a third adhesive mass 324c at a radially inward point of the overlay 316. An alternative arrangement is to use a foam adhesive combined with a silicone adhesive both selectively applied within the gap 318 for one of several purposes herein stated.

Figure 6:
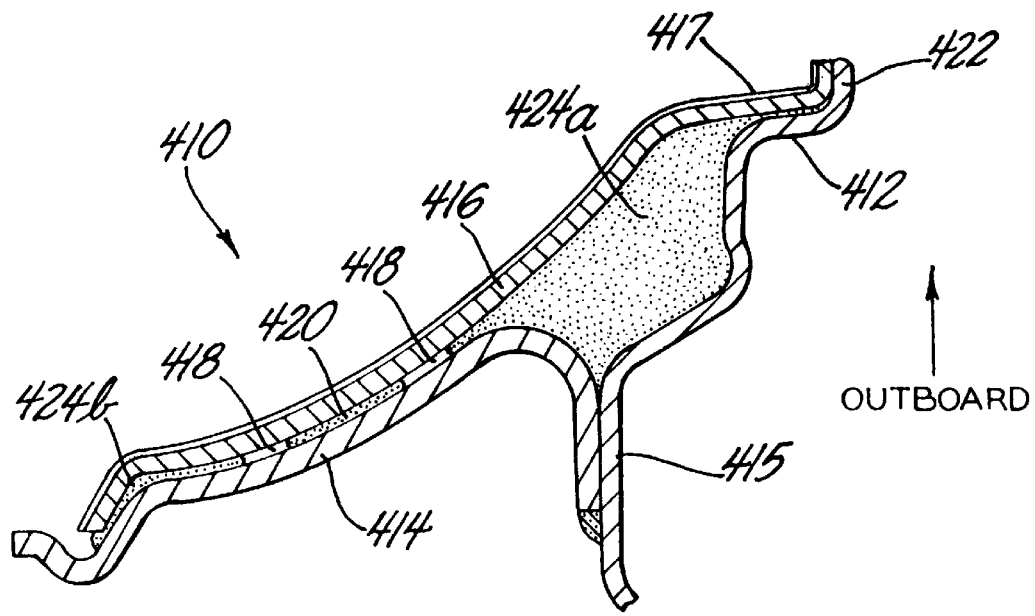
Figure 7:
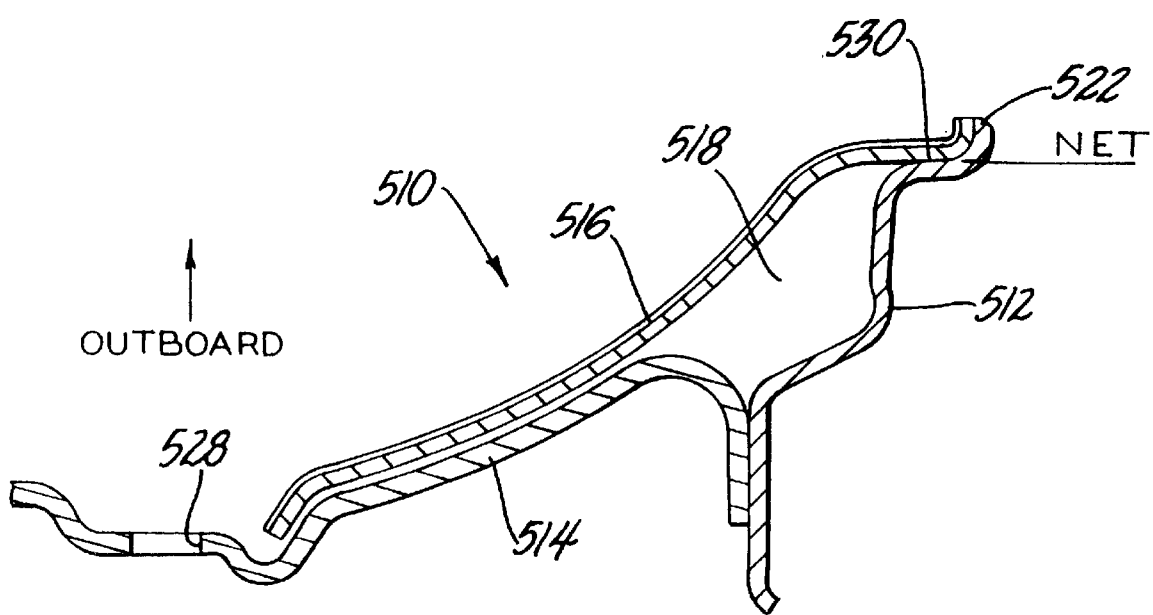

FIG. 6 illustrates another embodiment of an element for temporarily positioning and securing an overlay 416 to a wheel 410. In this embodiment, a double-sided adhesive tape 420 is disposed in a gap 418 between the overlay 416 and the outboard surface of the wheel 410, with a curable foam adhesive 424a and 424b also being disposed within the gap 418. As with the hot melt adhesive of FIG. 2, the adhesive tape 420 is not required to have a high temperature capability, allowing the use of a relatively inexpensive adhesive tape instead of a high temperature adhesive tape whose cost would be prohibitive. Again, the adhesive tape 420 serves only to temporarily secure and position the overlay 416 on the wheel 410 during the period in which the adhesive 424a and 424b cures. Advantageously, the adhesive tape 420 can be produced and obtained with a known thickness in order to accurately axially space the overlay 416 and wheel 410 apart, thereby allowing the assembler to predetermine the size of the gap 418.

FIG. 7 illustrates a further embodiment wherein the adhesive is used to compensate for the large dimensional tolerance variations between the cover and the web or disk of the wheel. Typically, the web or spider of a steel wheel is made using a stamping process. The resultant tolerance variations after the overlay has been assembled to the wheel may be as high as ±0.050 of an inch in the axial direction of the wheel. Therefore, the spacing between the web of the wheel and the overlay will vary significantly when considering a hi–lo condition in the axial direction. If such variations are allowed to occur at the outer lip 522 of the rim 512 of the wheel 10, that is, between the outer lip 522 of the wheel rim 512 and the overlay 516, the resultant variation in axial flushness at the edge of the wheel rim and the edge of the overlay would create an aesthetically unacceptable assembly for its intended purpose. Further, due to the fact that the overlay is a bright chrome plate luster while the rim of the steel wheel is not, any misalignment between them is perceived as greatly exaggerated due to the luster of the chrome surface on the overlay. To avoid such a condition it is contemplated that the planar flange area 530 of the wheel nearest the rim as shown in FIG. 7 would be a net location surface in the axial direction of the wheel. Accordingly, all of the dimensions of the wheel are made from this net surface. Since the outer edge of the overlay as well as the outer edge of the rim 512 of the wheel is but a short distance from the net surface, the axial position of the outer edge of the rim of the wheel as well as the outer edge of the rim of the overlay can be tightly toleranced to minimize any appreciable axial misalignment that may occur between the adjoining edges of the rims of the overlay and the wheel. Therefore, a tight tolerance will result in a close fit between the adjoining outer edges of the rim of the wheel and overlay. This is especially important since it is this area of the combined wheel and overlay that is most readily visualized by the consumer. Therefore, by carefully controlling the tolerance of the axial location of the respective outer edges of the rims of the wheel and overlay an aesthetically acceptable combination is obtained.

With regard to the hi–lo tolerance build up between the remainder of the overlay and the web of the wheel, the gap will vary according to the hi–lo conditions of various axial dimensions of the wheel and overlay. Therefore, sufficient adhesive is placed between the overlay and the wheel web to accommodate these variations in the gap. The preferred embodiment is shown with axially oriented net standoffs "120" at the outer periphery of the wheel. In the prior art it is typical to create a hi–lo tolerance drawing to show a minimum/maximum axial gap at the center area of the wheel. Since in the present invention the objective is to control the axial gap at the flange of the web as well as the flushness between the cladding and the rim the minimum/maximum condition at the center of the wheel is allowed to float since the adhesive will fill this void regardless of the variation in the axial direction. Since this gap could vary as much as 0.250 inches the use of foamed adhesive at the center of the wheel is preferred so that excessive squeeze out is minimized by collapsing of the void within the foam.

In view of the above, it can be seen that the embodiments illustrated in FIGS. 2 through 7 make combinations of overlays and wheels as well as novel methods for assembling the overlay to a wheel possible. Specifically, the general method involves temporarily securing an overlay to the outboard surface of a wheel in such a manner that the overlay will remain positively positioned on the wheel until the adhesive cures completely. Accurate placement of an overlay on a wheel is necessary not only for aesthetic appearances, but also for proper wheel balance. While the embodiments of FIGS. 2 and 7 require the use of equipment and/or fixtures for accurately locating the overlay on the wheel, the embodiments of FIGS. 3 through 5 advantageously serve to temporarily self-center the overlay to the wheel to ensure accurate concentric positioning of the overlay to the wheel while the embodiment of FIG. 7 accommodates the disadvantageous tolerance variations. Notably, the use of the snap tabs 120 of FIG. 3 are particularly expedient, in that an additional feature is not required on the wheel in order to accurately locate the overlay. In use, each of the elements illustrated in FIGS. 2 through 7 cause the overlay to be spaced apart from the outboard surface of the wheel so as to define a gap that accommodates the curable adhesive which permanently secures the overlay to the wheel.

The illustrated embodiments are not intended to be limiting. It is contemplated that other structural elements may be used to center the wheel as well as to accommodate tolerance variations which may result in unacceptable user perceived aesthetic conditions.

With reference again to FIG. 1, another important aspect of this invention is that the curable adhesive 30 used to permanently secure the overlay 16 to the wheel 10 can be selectively deposited such that only a portion of the gap between the overlay 16 and wheel 10 is filled. FIGS. 2 and 4 through 6 also illustrate aspects of this approach. In accordance with this invention, the ability to significantly reduce the amount of adhesive 30 used was not anticipated or expected, given the hostile thermal and physical environment of an automotive wheel. In fact, it is completely contrary to the teachings of all known prior art. In addition, to be able to use the selective application of the adhesive to favorably affect the curing time of the adhesive was a completely unexpected advantageous result. Advantageously, eliminating the necessity to fill the entire gap between the overlay 16 and wheel 10 enables the adhesive 30 to be selectively deposited to achieve any one or more refinements to the overall manufacturability, performance, and consumer-perceived quality of the wheel assembly.

In accordance with this invention, key areas in which a permanent adhesive is required include those regions which would otherwise allow ingress of water and dirt between the overlay 16 and wheel 10. FIG. 1 illustrates this aspect of the invention, in which the adhesive 30 is deposited around the perimeter of the wheel's outboard surface, turbine openings as well as around the lug bolt openings 28. Additional key areas include large span areas where the overlay 16 would otherwise be allowed to flex excessively and cause unwanted noise, and regions necessary to ensure adequate securement of the overlay 16 to the wheel 10. With this approach, the amount of adhesive 30 necessary to permanently bond the overlay 16 to the wheel 10 has been reduced to as little as twenty-five percent of the inboard surface area of the overlay 16. Such a capability not only reduces the overall weight of the wheel 10, but also significantly reduces material costs and the processing time required to dispense and cure the adhesive 30. As such, the manufacturability of the wheel 10 is significantly improved over prior art wheel assemblies using a permanently affixed overlay.

Additional benefits are identified with the teachings of this invention. For example, two or more different adhesive materials can be used as the adhesive 30, with higher temperature adhesives being deposited closer to the center of the wheel 10 where temperatures tend to be significantly higher, and less expensive adhesives having a lower temperature capability being deposited in the cooler, radially outward regions of the wheel. Furthermore, since the adhesive 30 inherently has a higher coefficient of thermal conductivity than air, the adhesive 30 can be selectively deposited in order to effect the transfer of heat from the wheel 10 to the overlay 16. Such an approach can be employed to insulate certain portions of the overlay 16 from extreme temperatures that would otherwise cause distortion or melting, and enhance heat transfer in other regions in order to promote heat dissipation from the wheel 10 through the overlay 16.

Two or more adhesives can also be used having different mechanical properties such as strength, ductility, impact and shock resistance, and physical characteristics such as porosity, density, color and UV-stability, and cure rates. For example, if the primary function of the adhesive 30 in a particular area of the wheel 10 is the forming of a water and dirt impervious seal, those characteristics that optimize an adhesive's sealing capability, such as porosity, can be optimized. Another example is the use of a lightweight foam adhesive to fill a large void present in a particular region between the wheel 10 and the overlay 16. Yet another example is where a UV-stable precolored adhesive is employed to fill exposed seams between the overlay 16 and the wheel 10 in order to conceal the composite construction of the wheel assembly.

Selective deposition of the adhesive 30 can also be advantageously used to alter the acoustical sound-deadening characteristics of the overlay 16 when struck, adjust and improve wheel balance, and compensate for dimensional variations in the wheel 10 and/or overlay 16. The ability to select the bonding points between the overlay 16 and the wheel 10 also permits distortions in the wheel 10 to be managed so as to minimize stresses in the overlay 16 and adhesive 30.

In addition to the above, a particularly advantageous use of two or more different adhesives is illustrated in the embodiments of FIGS. 2 and 6, in which an adhesive (20 and 420) capable of rapidly forming a bond is used to temporarily secure the overlay 16 to the wheel 10 while a slow-curing, high strength adhesive (30, 424a and 424b) is allowed to gradually cure in order to form a permanent bond between the overlay 16 and wheel 10. Instead of using a hot melt adhesive or adhesive tape, a rapidly curing adhesive could foreseeably be used to generally achieve the same goal. With either approach, the selective deposition of adhesive 30 provides the additional advantage of forming one or more voids that entrap air between the overlay 16 and the wheel 10. With air-curing and moisture-curing adhesives as the adhesive 30, such voids provide the volume of air or moisture necessary to increase the cure rate, thereby significantly reducing the cure times. If a moisture-curing adhesive is used, assembly of the overlay 16 and wheel 10 can be performed in a high humidity environment, such that moisture laden air becomes entrapped between the overlay 16 and the wheel 10. As such, selective deposition of the adhesive 30 in accordance with this invention can be employed to optimize cure times under many manufacturing conditions.

From the above, it can be seen that a significant advantage of this invention is that an improved apparatus and method is provided for assembling an overlay with an automotive aluminum cast or standard steel wheel. In one aspect, the invention provides an intermediate positive fixing element for temporarily positioning and securing the overlay to the wheel during an interval in which a slow-curing, high strength adhesive that permanently adheres the overlay to the wheel is allowed to cure. An interrelated aspect of this invention involves the selective placement of adhesive between the overlay and the wheel so as to improve the overall manufacturability, performance, and consumer-perceived quality of the resulting wheel assembly.

In accordance with this invention, the overlay can be temporarily secured to the wheel with various elements in such a manner that the overlay remains positively positioned on the wheel until the permanent securing element is in place. Regardless of its form, an element for temporarily securing the overlay is not required to reliably secure the overlay to the outboard surface of the wheel in service. Notably, such a capability would be redundant and add unnecessary costs to the wheel. Therefore, the role of such an element is to maintain the positional location of the overlay on the wheel during a period in which the permanent adhesive becomes fully cured.

Another significant advantage of this invention is that the curable adhesive can be deposited such that only a portion of the gap between the overlay and wheel is filled. As a result, one or more voids are present between the overlay and the outboard surface of the wheel. As discussed above, such a capability, though unexpected, enables the permanent adhesive to be selectively deposited to achieve any one or more refinements to the overall manufacturability, performance, and consumer-perceived quality of the wheel assembly. For example, the permanent adhesive can be applied only to the extent necessary to exclude moisture and dirt from the gap between the overlay and wheel. The resulting void can serve as a reservoir for air or moisture laden air for air-cured and moisture-cured adhesives, thereby improving the cure rate of the adhesive. The permanent adhesive can also be deposited in order to manage thermal conduction between the wheel and overlay, tailor the acoustical characteristics of the wheel assembly, accommodate tolerance variations between the wheel and the overlay and effect the balance of the wheel. Finally, the use of less adhesive also serves to reduce the weight and the material as well as the overall manufacturing costs of the wheel assembly.

While the invention has been described in terms of preferred embodiments, it is apparent that other forms could be adopted by one skilled in the art. Accordingly, the scope of the invention is to be limited only by the following claims.

What is claimed is:

1. A method for compensating for tolerance variations between an overlay having a rim flange and a wheel assembly including a web having an inner peripheral end portion defining a hub opening surrounded by a plurality of lug bolt openings; a rim portion circumscribing said web portion and a peripheral lip circumscribing said rim portion, said web and rim portions defining an outboard surface of said wheel assembly, said method comprising the steps of:

selecting a net location surface along an axially outboard rim flange surface of said rim portion of said wheel assembly, said rim flange surface being contiguous said peripheral lip circumscribing said rim portion of said wheel assembly;

selecting a surface contiguous said rim flange on an inboard surface of said overlay; and assembling said overlay to said wheel assembly by locating said surface contiguous said rim flange of said overlay to said net location surface of said rim portion of said wheel assembly, said assembly step net locating said overlay to said wheel assembly at said net location surface of said rim portion of said wheel assembly such that tolerance variations between said overlay and said wheel assembly at said net location surface will be minimized regardless of the size of the variable space between said inboard surface of said overlay and said outboard surface of said wheel assembly; and depositing an adhesive on at least a portion of one of said inboard surface of said overlay and said outboard surface of said wheel assembly such that said variable space between said overlay and said outboard surface of said wheel assembly is compensated by said application of said adhesive to permanently attach said overlay to said wheel assembly.

2. The method as claimed in claim 1 wherein said step of depositing an adhesive occurs prior to said step of assembling said overlay to said wheel assembly.

3. The method as claimed in claim 1 further comprising the step of:

placing a foamable adhesive between said overlay and said wheel assembly whereby said variable axial spacing is filled by said foamable adhesive such that said tolerance variation between said overlay and said wheel assembly is compensated by said foamable adhesive.

4. The method as claimed in claim 1 further comprising the step of:

inserting at least one positioning element between said overlay and said wheel assembly to temporarily secure said overlay onto said wheel assembly and to position said overlay concentrically on said wheel assembly.

5. The method of claim 1 further comprising the step of providing a means located between said wheel assembly and said overlay, for temporarily securing said overlay to said outboard surface of said wheel assembly and for positively positioning said overlay on said outboard surface of said wheel assembly.

6. The method of claim 1 further comprising the step of providing a means located between said wheel assembly and said overlay for permanently securing said overlay to said outboard surface of said wheel assembly and for positively positioning said overlay on said outboard surface of said wheel assembly.

7. The method of claim 5 wherein said temporary securing and positioning means comprises a mechanical element.

8. The method as claimed in claim 1 wherein said adhesive is applied selectively.

* * * * *

UNITED STATES PATENT AND TRADEMARK OFFICE
CERTIFICATE OF CORRECTION

PATENT NO. : 5,845,973
DATED : December 8, 1998
INVENTOR(S) : Lee A. Chase

It is certified that error appears in the above-identified patent and that said Letters Patent is hereby corrected as shown below:

Column 10, line 45 kindly delete " "120" " and insert ---- 120 ----.

Signed and Sealed this

Eighth Day of February, 2000

Attest:

Q. TODD DICKINSON

Attesting Officer

Commissioner of Patents and Trademarks